3,172,742
HYDROGEN DIFFUSION PROCESS
Leonard R. Rubin, Union, N.J., assignor to Engelhard Industries, Inc., Newark, N.J., a corporation of Delaware
No Drawing. Filed Mar. 7, 1963, Ser. No. 263,405
8 Claims. (Cl. 55—16)

This invention relates to a process for purifying hydrogen and for separating hydrogen from a mixture of gases containing hydrogen by means of selective diffusion of hydrogen through a hydrogen-permeable diffusion septum. More particularly, this invention concerns such a process in which the hydrogen-permeable septum is an alloy of palladium and a metal of the group consisting of (a) uranium and (b) uranium and silver, the uranium being present in an amount of 1–10 parts by weight and the silver being present in the ternary alloy in an amount of 10–25 parts by weight per 100 parts of alloy.

Processes for obtaining high purity hydrogen or for separating hydrogen from a mixture of gases containing free hydrogen by means of diffusion through a palladium septum are known. The processes afford a means of producing high purity hydrogen through the use of relatively simple devices.

By "diffusion septum" is meant a membrane, foil, tube, or plurality of such membranes, foils, or tubes; or a coating on a porous support which serves as a barrier between the feed gas and the effluent gas and which is permeable to certain gases. In this invention, the gas to which the septum is permeable is hydrogen.

The techniques of hydrogen diffusion through a permeable diffusion septum are well known to the art, and the distinction between such processes and passage of gases through porous film or membrane need not be further explained in detail. The process of permeation utilized in the present invention involves the passage of hydrogen gas from the high-pressure side of a nonporous septum through the solid material of the septum and out the low-pressure side thereof. The permeable septum which is employed in the practice of the invention is necessarily non-porous, that is essentially free from holes, voids, pores or other defects which affect the continuity of the film.

It is well known that hydrogen will diffuse through palladium selectively. If a mixture of gases containing hydrogen is contacted with one surface of palladium, substantially only hydrogen and its isotopes will diffuse through the palladium so that the hydrogen evolving from the opposite surface is extremely pure. There is hardly a perceptible permeation of any other gases through palladium. At sufficiently high temperatures, the rate of diffusion of hydrogen through palladium is rapid enough so that commercial applications of this means of producing high purity hydrogen have been developed.

The rate of diffusion of a gas through a metal increases with increasing temperature, and it is thus desirable to operate at elevated temperatures to maximize the productivity of the diffusion septum. In addition to the higher rate of permeability that can be realized with the use of elevated temperatures, there are further advantages to be gained from operating in a high temperature range. For example, hydrogen diffusion systems may be used in conjunction with gas-phase reactions which require high temperatures, i.e., greater than 500° C. Diffusion septa capable of withstanding such high temperatures are desirable.

Pure palladium, which shows excellent permeability at high temperatures, has the disadvantage of being less strong at elevated temperatures than its solid solution alloys. As any pure metal it is more subject to creep at low stress levels than its single-phase alloys at equivalent temperatures. Another difficulty is the marked change in properties of pure palladium when it is subjected to alternate periods of heating and cooling in the presence of hydrogen due to β-phase transformation. Repeated cycles of heating and cooling in the presence of hydrogen lead to the gross deformation and eventual perforation or rupture of the palladium septum. While β-phase transformation can be avoided by operating at all times above the critical temperature, the loss of strength on heating is a characteristic which can only be avoided by operating at suitably low temperatures, e.g. below about 500° C.

It is known that solid solution alloys generally exhibit greater strength at higher temperatures than their pure components. However, with rare exceptions, the addition of any metal to palladium reduces the permeability of the palladium to hydrogen. This is a severe penalty since the permeability to hydrogen is the most important parameter of materials to be used for hydrogen diffusion purposes.

In accordance with this invention, it has been found that certain compositions of palladium and uranium are superior to pure palladium for use as diffusion septa for the purification of hydrogen or the separation of hydrogen from a mixture of gases, particularly at high temperatures. Such alloys exhibit permeability at least equal to that of pure palladium at higher temperatures, particularly about 500° C., while having greater strength at such temperatures. This discovery is surprising and unexpected since, as indicated above, it has hitherto been determined that addition of any metal to palladium generally reduces the permeability of the palladium to hydrogen.

The materials which are employed as diffusion septa in accordance with the present invention consist of solid solution alloys of palladium and a metal selected from the group consisting of (a) uranium and (b) silver together with uranium, the uranium being present in an amount between 1 and 10 parts, and the silver being present in the ternary alloys in an amount between 10 and 25 parts per 100 parts of alloy. Typical of these alloy compositions are: Pd—7U, Pd—5U, Pd—3U, Pd—23Ag—1U Pd—14Ag—5U and Pd—18—½Ag—3U. The alloys Pd—7U and Pd—14Ag—5U have been found to be particularly outstanding. It is to be understood that throughout the specification and claims hereof, the designation "Pd—7U" means an alloy of palladium and uranium containing 7 parts by weight uranium per 100 parts of alloy, the remainder being palladium. Similarly, "Pd—23Ag—1U"

means an alloy of palladium, silver and uranium containing 23 parts by weight silver and 1 part by weight uranium per 100 parts of alloy, the remainder being palladium.

The temperature range within which the palladium-uranium compositions of this invention can be employed is from 200° to 800° C., although higher temperatures can be used. It is usually not practical to operate a hydrogen system above 800° C. because of the effect of such high temperature on parts of the equipment other than the diffusion septum. Temperatures below 200° C., e.g. as low as room temperature, can be used, but the rate of diffusion is then slow and may be commercially unattractive. The greater permeability at elevated temperatures of certain palladium-uranium and palladium-silver-uranium alloys than prior art pure palladium and palladium-silver alloys makes such palladium-uranium alloys especially favorable for use under high temperature conditions.

A composition of this invention can be used in any form whereby it serves as a barrier between the upstream and downstream gas. For example, the material may be in the form of a sheet, tube, film or coating on a porous support, or a plurality of such forms. The material may be formed in any known manner, but it is important that it be non-porous and of sufficient physical strength. The thinner the material, the harder it is a fabricate with desirable characteristics, but the more desirable in terms of rate of $H_2$ diffusion.

It is desirable to have the solid through which the hydrogen will diffuse as thin as possible since the rate of diffusion of a gas through a metal varies inversely with the thickness of the metal. The rate of diffusion of a gas through a metal is also dependent upon the difference in pressure between the upstream and downstream gases, but an opposing factor is that the thinner the material, the less differential in pressure it can withstand without support. In determining the thickness of the metal to be used, consideration must be given to the pressure differential which the metal is capable of withstanding. However, there is no upper limit as regards pressure differential for the diffusion compositions of this invention, since the pressure differentials which a barrier can withstand can vary with the particular construction of the diffusion septum. For example, a supported membrane can be made to withstand greater pressure differentials than an unsupported membrane, and tubes will generally withstand higher pressure differentials than unsupported, thin films.

The process of the present invention can be employed to separate hydrogen from mixtures of gases in which hydrogen is a major or minor component, and operability of the process is independent of the specific proportion of hydrogen in such gases. Obviously, gaseous mixtures containing minor percentages of hydrogen provide a lower partial pressure of hydrogen, and the rate of diffusion, which is a function of pressure, will as a result be reduced. The invention is valuable as a means for removing hydrogen from gaseous mixtures to provide effluent gases free from hydrogen, and as a means for producing hydrogen streams of high purity.

EXAMPLE I

The hydrogen permeability of a number of palladium-uranium alloys was determined in comparison with pure palladium and a known palladium-silver alloy containing 25% Ag. In each case, a non-porous disc of the alloy approximately 30 mils in thickness and 0.68 inch² area was prepared and employed as a diffusion septum in a test diffusion cell. The cell comprised an inlet and outlet chamber separated by the disc. Inlet pressure of pure hydrogen was varied between 10 and 60 p.s.i.g. and outlet pressure maintained at 0 p.s.i.g.

The data in Table I are tabulated in cubic feet of hydrogen at standard conditions per square inch of 1 mil thick diaphragm at a hydrogen partial pressure differential between the upstream and downstream hydrogen such that the square root of the partial pressure difference, expressed as (p.s.i.a.)$^{1/2}$, is unity. Expressed in other terms Permeability = $K$ = flow rate (s.c.f.h.)-mil/(p.s.i.a.)$^{1/2}$-inch²

It will be realized that the method of expressing the experimental results is independent of the particular thickness of the sample tested and particular pressure employed. The K values reported in Table I are values obtained by averaging the results of tests on one or more samples as determined at different inlet pressures within the range indicated above.

Table I

| Run No. | Material | 450° C. | 500° C. | 550° C. | 600° C. | 650° C. | 700° C. | 750° C. | 800° C. |
| --- | --- | --- | --- | --- | --- | --- | --- | --- | --- |
| 1 | Pd | .10 | .11 | .14 | .17 | .18 | .22 | .25 | .28 |
| 2 | Pd–25Ag | .12 | .14 | .16 | .18 | .20 | .18 | .20 | .23 |
| 3 | Pd–7U | .10 | .11 | .13 | .18 | .20 | .23 | .26 | .32 |
| 4 | Pd–5U | .11 | .13 | .15 | .17 | .20 | | | |
| 5 | Pd–23Ag–1U | .12 | .13 | .15 | .18 | .21 | .25 | .26 | .27 |
| 6 | Pd–18-½Ag–3U | | | | .15 | .17 | .20 | .22 | .23 |
| 7 | Pd–14Ag–5U | | | | .19 | .20 | .24 | .27 | .29 |

The data given in Table I shows that palladium-uranium and palladium-silver-uranium alloys have hydrogen permeability at least equal to that of pure palladium over the given temperature range. Runs 3 and 7 show alloys of Pd—7U and Pd—14Ag—5U respectively, which have superior permeability to that of Pd—25Ag at higher temperatures. At temperatures over 750° C., Pd—25Ag shows lower permeability than pure palladium. It is of particular interest that the alloy indicated by run 7 shows superior permeability to Pd—25Ag in this range. In addition to the good permeability characteristics, the palladium-silver-uranium alloys show no deleterious phase transformation.

Table II shows the hydrogen flow determined by the tests on 30 mil thick discs at 800° C. and at various pressures for typical alloys of this invention. In Table II, the flow is given as cubic centimeters of hydrogen (at standard conditions) and is referred to 1 square inch of 1 mil foil. The data indicate that as the pressure increases the improved rates of flow in runs 3 and 7 become more significant, particularly with respect to Pd—25Ag.

Table II

[Flow in cc./min./square inch of 1 mil foil at 800° C.]

| Run | 1 | 2 | 3 | 6 | 7 |
| --- | --- | --- | --- | --- | --- |
| Material | Pd | Pd–25Ag | Pd–7U | Pd–18-1/2Ag–3U | Pd–14Ag–5U |
| P upstream (p.s.i.g.): | | | | | |
| 15 | 211 | 211 | 233 | 163 | 195 |
| 20 | 255 | | 295 | 208 | |
| 25 | 321 | | 366 | 253 | 344 |
| 30 | 364 | 312–333 | 425 | 285 | |
| 35 | 428 | | 487 | 323 | 451 |
| 40 | | 404 | | 365 | |
| 45 | | | | 408 | 557 |
| 50 | | 463–467 | | 449 | |
| 55 | | | | 483 | 663 |
| 60 | | 549 | | 514 | 688 |

What is claimed is:
1. A process for separating hydrogen from a mixture of gases containing hydrogen which process comprises contacting said gaseous mixture with one side of a non-porous septum consisting of an alloy of palladium and a metal selected from the group consisting of (a) uranium and (b) silver together with uranium, the uranium being present in an amount between 1 and 10 parts by weight, and the silver being present in an amount between 10 and 25 parts by weight per 100 parts of the alloy, and recovering diffused hydrogen from the other side of the septum.

2. The process of claim 1 wherein the said contacting is effected at a temperature in the range of about 450° to 800° C.

3. The process of claim 1 wherein the alloy consists of Pd—7U.

4. The process of claim 1 wherein the alloy consists of Pd—23Ag—1U.

5. The process of claim 1 wherein the alloy consists of Pd—14Ag—5U.

6. A palladium-silver-uranium alloy for diffusion separation of hydrogen from a mixture of gases which alloy contains from 1 to 10 parts uranium, and from 10–25 parts silver, the remainder being palladium, per 100 parts alloy.

7. The alloy of claim 6 consisting of Pd—23Ag—1U.

8. The alloy of claim 6 consisting of Pd—14Ag—5U.

References Cited in the file of this patent

UNITED STATES PATENTS 2,391,456    Hensel ---------------- Dec. 25, 1945
2,958,391    De Rosset ------------- Nov. 1, 1960

OTHER REFERENCES

Catterall, J. A., Grogan, J. D., Pleasance, R. J.: The System Uranium-Palladium, in Journal of the Institute of Metals, volume 85, article 1721, pages 63–67, October 1956.